United States Patent
Lippincott

(10) Patent No.: US 6,577,722 B1
(45) Date of Patent: Jun. 10, 2003

(54) CALL WAITING RESPONSE STATUS

(75) Inventor: Robert Alan Lippincott, Milford, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/167,330

(22) Filed: Oct. 7, 1998

(51) Int. Cl.$^7$ ................................................ H04M 3/42
(52) U.S. Cl. ........................... 379/215.01; 379/142.08; 379/93.35
(58) Field of Search .................. 379/142.08, 201.01, 379/215.01, 93.35

(56) References Cited

U.S. PATENT DOCUMENTS

| | | | | |
|---|---|---|---|---|
| 5,828,742 A | * | 10/1998 | Khalid et al. | 379/215.01 |
| 5,974,131 A | * | 10/1999 | Malik | 379/215.01 |
| 6,014,434 A | * | 1/2000 | Kim | 379/215.01 |
| 6,047,057 A | * | 4/2000 | Weishut et al. | 379/215.01 |
| 6,289,092 B1 | * | 9/2001 | Nishiara | 379/201.01 |
| 6,339,639 B1 | * | 1/2002 | Henderson | 379/142.08 |
| 6,343,121 B1 | * | 1/2002 | Infosino | 379/215.01 |

* cited by examiner

*Primary Examiner*—Fan Tsang
*Assistant Examiner*—Gerald Gauthier
(74) *Attorney, Agent, or Firm*—William H. Bollman

(57) ABSTRACT

A method to handle an incoming call to a target telephone that is engaged in a present call. A first signal to the target telephone indicates an incoming call, and a second signal to the calling telephone indicates that the target telephone is busy. Another method issues a first signal to a target telephone to indicate an incoming call. A ringback tone is issued to the calling telephone causing a speaker of the calling telephone to provide a ringing sound to the caller. A switch-hook signal from the target telephone indicates a desire of a user of the target telephone to place a party to the present call on hold, and to connect to the incoming call. A busy signal, is issued to the calling telephone causing its speaker to provide a busy sound if the switch-hook signal is not received by the time a variable reaches a predetermined limit.

14 Claims, 2 Drawing Sheets

CALL WAITING RESPONSE STATUS

CROSS-REFERENCE TO RELATED APPLICATIONS

This application is related to U.S. patent application Ser. No. 09/167,344, entitled Flash-Hook Caller ID, which issued as U.S. Pat. No. 6,075,850 on Jun. 13, 2000, co-filed herewith and incorporated herein by reference.

FIELD OF THE INVENTION

This invention is related to the field of telephony, and in particular to the call waiting feature.

BACKGROUND OF THE INVENTION

Call waiting is a feature provided by a telephone service provider. The feature allows a user to be notified of incoming telephone calls while the user is already engaged in a previous telephone call. Typically, a central office of the telephone service provider issues a Subscriber Alert Signal (SAS) tone to inform the user that a new incoming call is available. Further, if the user subscribes to Caller ID Type 2 service, also known as Caller ID with Call Waiting (CID/CW), the central office issues a Caller ID Alert Signal (CAS) tone, as described in Bellcore standard FR12 (incorporated herein by reference), and further issues Caller ID data, in frequency shift keying (FSK) form, to provide the user with data identifying the incoming caller.

The incoming caller hears a periodic ringing sound from a speaker of the incoming caller's telephone while the SAS tone, CAS tone, and Type 2 Caller ID data are being transmitted to the user. If the user elects to speak to the incoming caller and to temporarily place the previously existing call into a hold status, the user manipulates a switch-hook of the user's telephone, and the central office responds by connecting the user to the incoming caller while placing the previous caller into the hold status. The user can toggle back and forth between the two parties (the first party to the previous call and the second party, hereinbefore identified as the incoming caller) indefinitely by continuing to activate the switch-hook of the user's telephone.

An advantage of the call waiting feature is that the user is made aware of an incoming call even though the user is engaged in a previous telephone call. A further advantage is that, depending on the capabilities of the user's telephone and the service provided by the telephone service provider, the user may be provided with information related to the incoming call, such as Caller ID data. Some users, however, may elect to maintain the initial connection and not switch to the incoming call. For example, these users may perceive that it is rude to cut off a present call, and will prefer, based on the Caller ID data, to call the incoming caller back after the present call is complete.

According to conventional practice, however, the incoming caller is not aware that the user is engaged in a previous telephone call, and may erroneously interpret the lack of an answer to the incoming call as an indication that the user is not at home. This can be problematic. For example, the incoming caller may not stay near the incoming caller's telephone after trying unsuccessfully to contact the user, and may therefore miss the return call from the user. Further, the user's safety may be jeopardized if the lack of an answer to the incoming call erroneously informs others that the user's home is unoccupied. A need exists, therefore for a process, preferably based on user preferences, that informs an incoming caller that the user is presently engaged in a telephone call.

SUMMARY OF THE INVENTION

In a first embodiment according to the invention, a method is provided for handling an incoming call from an incoming telephone directed to a target telephone that is engaged in a present call. The method includes the steps of issuing a first signal to the target telephone to inform the target telephone of the incoming call, and issuing a second signal to the incoming telephone to inform the incoming telephone that the target telephone is engaged in the present call.

In an alternative embodiment according to the invention, a method of handling an incoming call includes a step of issuing a first signal to a target telephone to inform the target telephone of the incoming call. The method also includes a step of issuing a ringing signal to an incoming telephone to cause a speaker of the incoming telephone to provide a ringing sound to an incoming caller. The method further includes a step of waiting for a switch-hook signal from the target telephone, the switch-hook signal indicating a desire of a user of the target telephone to place a party to the present call into a hold status and connect to the incoming call. Finally, the method also includes a step of issuing a busy signal to the incoming telephone in order to cause the speaker to provide a busy sound if the switch-hook signal is not received by the time a variable reaches a predetermined limit.

BRIEF DESCRIPTION OF THE DRAWING

These and other objects and advantages of the invention will be apparent to one of ordinary skill in the art upon review of the following description in light of the figures, wherein.

DETAILED DESCRIPTION

Figure 1:
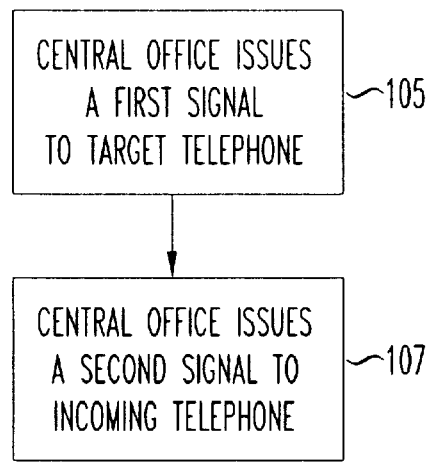
FIG. 1 provides an operational flowchart of a first embodiment according to the invention.

FIG. 1 provides a flowchart of the operations of a telephone service provider, such as at a central office, according to a first embodiment according to the invention. The scenario is that a user is engaged in a present telephone conversation, and that the user, or at least the user's telephone, is the target for a new incoming call from an incoming caller. At step 105, the central office issues a first signal to the target telephone. The first signal may be, for example, a conventional SAS tone, and may further be coupled with a CAS tone, Caller ID data, etc. The first signal is issued, for example, to inform the target telephone of the incoming call.

At step 107, the central office also issues a second signal to the incoming telephone to inform the incoming telephone that the target party is engaged in the present call. The second signal may be, for example, a busy signal, although any form of signaling may be employed according to the invention. Further, the operative order of step 107 occurring after step 105 is purely exemplary, and illustrates an embodiment wherein the second signal may be issued after the first signal, either immediately, or upon the satisfaction of a criterion. Alternatively, the second signal may be issued before or in parallel with the first signal. In any event, the second signal provides the incoming telephone with information regarding the target telephone, such as, for example, that the target telephone is currently in use. Based on this information, the incoming caller may decide, for example, to remain on the line or to hang up and await a return call from the target party or try again in a few minutes.

The second signal may take the form of a busy signal. In one embodiment according to the invention, the second signal, in the form of a busy signal, is not issued immediately after the first signal, but is instead issued after one or more ringing signals. This scenario would occur, for example, if the target party elected to maintain the original connection and not switch-hook over to the incoming call. Alternatively, the determination that the target party elects to maintain the original connection may be based on the lapse of a predetermined period of time.

Figure 2:
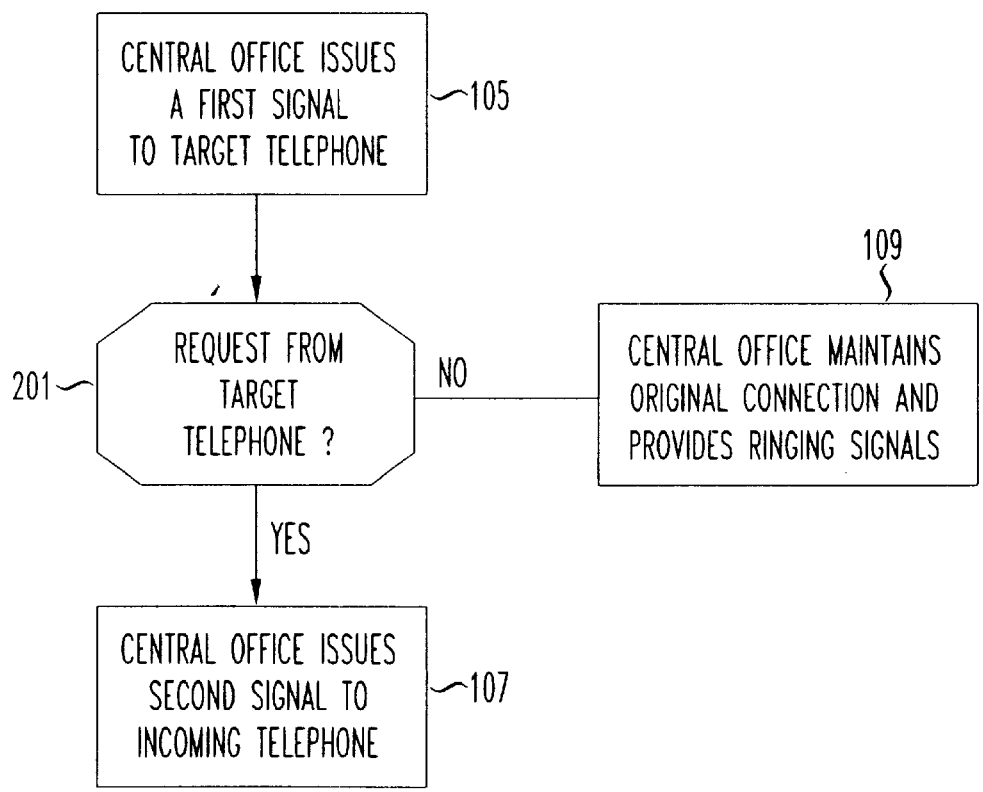
FIG. 2 provides an operational flowchart of a second embodiment according to the invention.

FIG. 2 shows an alternative embodiment according to the invention, which also includes step 201, wherein the central office determines if there is a request from the target telephone to issue the second signal, prior to issuing the second signal. If there is a request, then the central office proceeds with step 107. If, on the other hand, there is not a request, then the central office does not proceed with step 107, and instead advances to step 109, wherein the central office maintains the original connection and provides conventional ring signals to the incoming telephone.

The determination at step 201 may be based on real-time input from the target telephone, or may be based on previously stored information. For example, if based on real time information, step 201 may include a wait loop, during which the central office waits for a signal from the target telephone. If such a signal is received during the wait loop, the central office proceeds to step 107. If, on the other hand, the wait loop expires without a signal from the target telephone, then the central office proceeds to step 109.

Alternatively, the determination at step 201 may include a reference to a look-up table that contains information regarding the telephone numbers or other information relating to target parties for which the second signal may be sent. The table may provide the opportunity to discriminate between incoming callers based, for example, on Caller ID data. Thus, the second signal may be provided to a first incoming telephone that is authorized to receive the second signal, but may not be provided to a second incoming telephone that is not authorized to receive the second signal.

Figure 3:
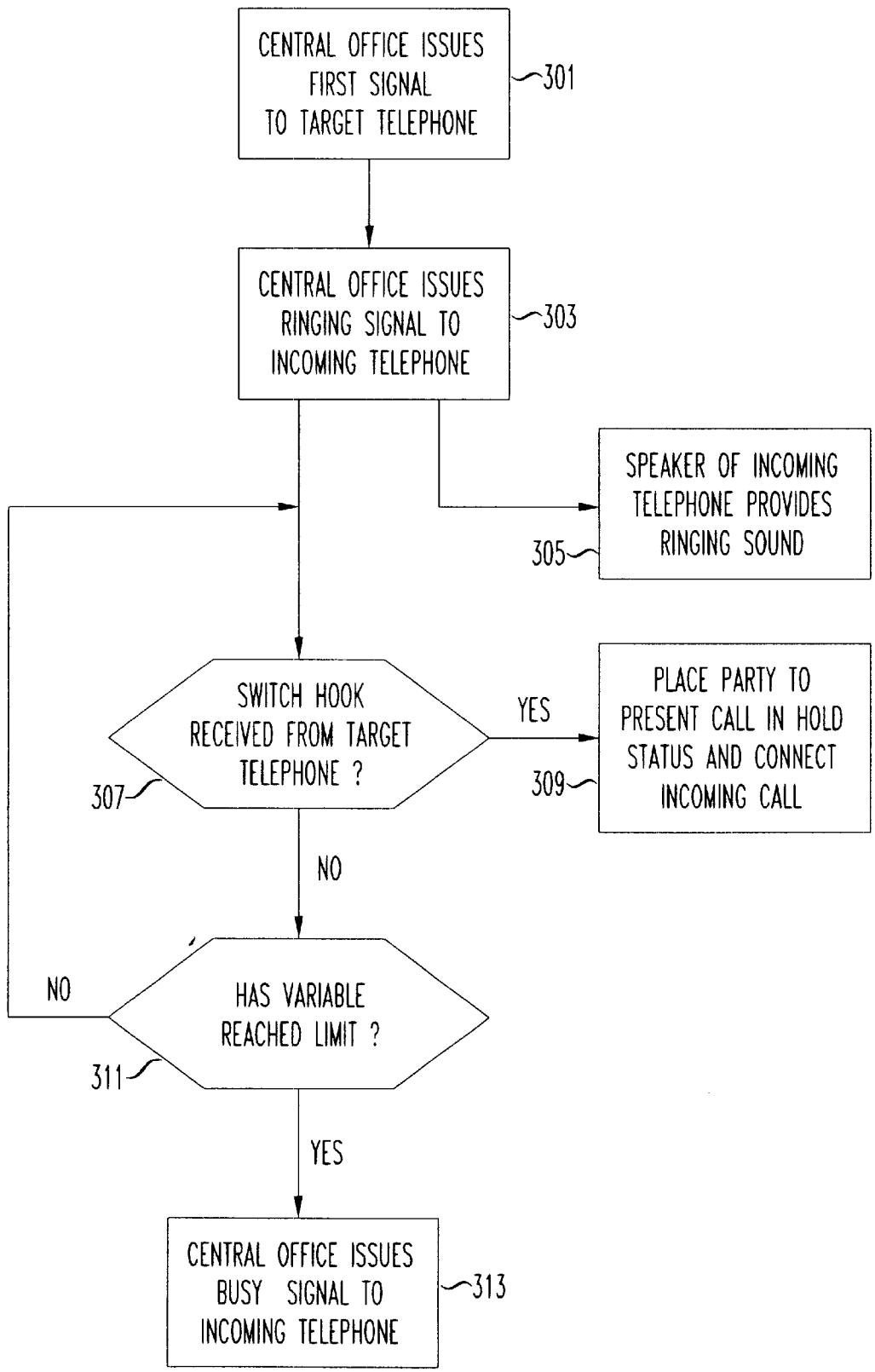
FIG. 3 provides an operational flowchart of a third embodiment according to the invention.

FIG. 3 provides a more detailed operational flowchart according to the invention. At step 301, the central office issues the first signal to the target telephone to inform the target telephone of the incoming call. At step 303, the central office issues a signal to the incoming telephone to cause the incoming telephone, at step 305, to provide an audible signal indicating to the incoming caller that the target telephone is ringing. Of course, since the target telephone is already engaged in a present call, it does not in fact ring, but issues a SAS tone to the target caller. However, as is conventional, the audible signal provided to the incoming caller creates the impression that the target telephone is ringing.

At step 307, the central office determines if a switch-hook signal is received from the target telephone in response to the first signal. If the answer is YES, the central office places a party to the present call in a hold status and connects the incoming call at step 309. If the answer at step 307 is NO, on the other hand, the central office proceeds to step 311, where it determines if a variable has reached a predetermined limit. For example, the central office determines if a ring count has reached a predetermined number, such as three, or if a timer has reached a predetermined time period. If the variable has not reached the predetermined limit, the central office returns to step 307 to once again determine if a switch-hook signal is received. The central office will thus repeat steps 307 and 311 until either the switch-hook signal is received, at which point it proceeds to step 309, or until the variable has reached its limit. If the variable has reached its limit, the central office proceeds to step 313, where it issues a busy signal to the incoming telephone.

As a result, the incoming caller is no longer in the dark regarding the status of the target party. Instead, the incoming caller, upon receiving the busy signal at step 313, is now aware that the target telephone is engaged in a present conversation, implying, of course, that someone, such as the target party, is likely present at the location of the target telephone. With this additional information, the incoming caller may now decide to wait for the target party to return the call, if, for example, the incoming caller knows that the target party has CID/CW service. Alternatively, the incoming caller may decide to try to call the target party again in a few minutes.

Step 313 can, of course, be preceded by one or more steps wherein the central office determines, for example based on Caller ID data, whether the incoming telephone is authorized to receive the busy signal.

Various embodiments of the invention having been described, it should be apparent to one of skill in the art that many alternative embodiments can be developed according to the invention. For example, although the invention is principally described as utilizing a central office of a public switched telephone network, the concept of the invention can equally be employed in a digital network, such as the internet, by any service provider, and can also be effectively employed in either a wired or a wireless network.

What is claimed is:

1. A method of handling an incoming call from a calling telephone directed to a target telephone that is already engaged in a present call, comprising steps of:

issuing a first signal to a target telephone to inform the target telephone of the incoming call;

initially providing a ringback signal to the calling telephone; and after at least one ringback signal is provided to the calling telephone, then issuing a second signal to the calling telephone to inform the calling telephone that the target telephone is already engaged in the present call.

2. A method of handling an incoming call as recited in claim 1, wherein the second signal is a busy signal.

3. A method of handling an incoming call as recited in claim 2, wherein the busy signal follows a predetermined number of ringback signals.

4. A method of handling an incoming call as recited in claim 2, wherein the busy signal is issued a predetermined period of time after issuance of the first signal.

5. A method of handling an incoming call as recited in claim 2, wherein the busy signal is issued only if the target telephone does not request access to the incoming call during the predetermined period of time.

6. A method of handling an incoming call as recited in claim 5, wherein the second signal is issued in response to a request from the target telephone.

7. A method of handling an incoming call as recited in claim 1, further comprising the step of determining if the second signal is authorized for the target telephone, and wherein the step of issuing the second signal occurs only if the determination is that the second signal is authorized.

8. A method of handling an incoming call as recited in claim 1, wherein the determining step comprises comparing information associated with the target telephone to an information table.

9. A method of handling an incoming call as recited in claim 8, wherein the information is a telephone number of the target telephone.

10. A method of handling an incoming call as recited in claim 1, wherein the determining step is based on information received from the target telephone.

11. A method of handling an incoming call as recited in claim 8, wherein the information is received after the first signal is issued to the target telephone.

12. A method of handling an incoming call from a calling telephone directed to a target telephone that is engaged in a present call, comprising steps of:

issuing a first signal to the target telephone to inform the target telephone of the incoming call;

issuing a signal to the calling telephone to cause a speaker of the calling telephone to provide a ringing sound to a caller;

waiting for a switch-hook signal from the target telephone, the switch-hook signal indicating a desire of a user of the target telephone to place a party to the present call into a hold status and connect to the incoming call; and issuing a busy signal to the calling telephone to cause the speaker to provide a busy sound if the switch-hook signal is not received before a predetermined limit is reached.

13. A method as recited in claim 12, wherein the variable is time, such that the predetermined limit is a time period.

14. A method as recited in claim 12, wherein the variable is a ring count, such that the predetermined limit is a set number of rings.

* * * * *